June 22, 1954
J. T. VOORHEIS
2,681,736
DUPLEX STRAINER
Filed Aug. 20, 1948
3 Sheets-Sheet 1
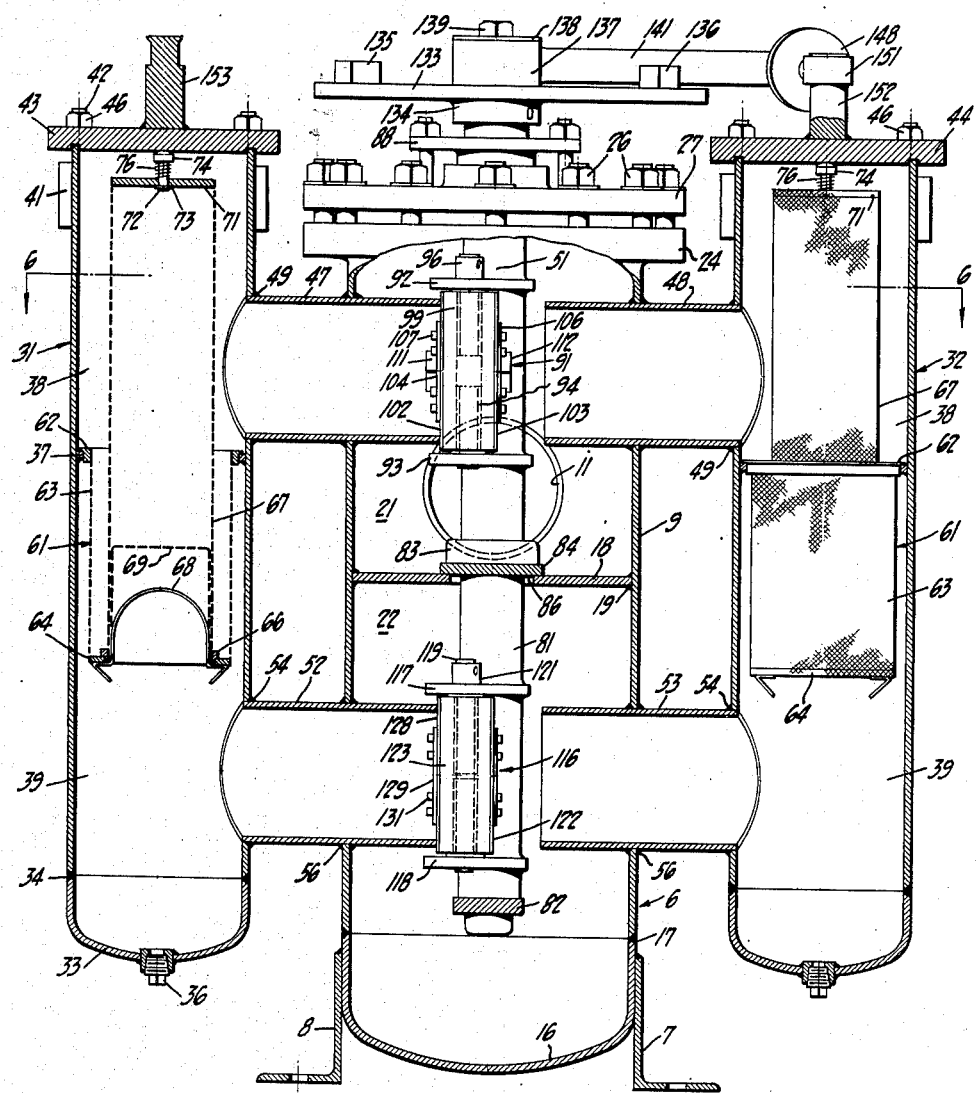
FIG_1_
INVENTOR.
Joseph T. Voorheis
BY
Attorney June 22, 1954   J. T. VOORHEIS   2,681,736
DUPLEX STRAINER
Filed Aug. 20, 1948   3 Sheets-Sheet 2
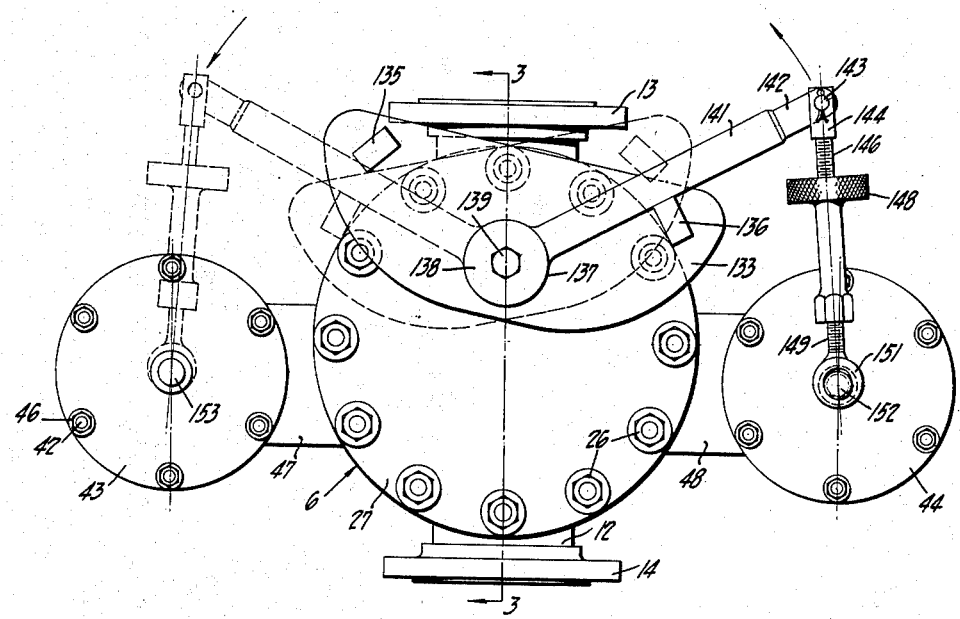
FIG_2_
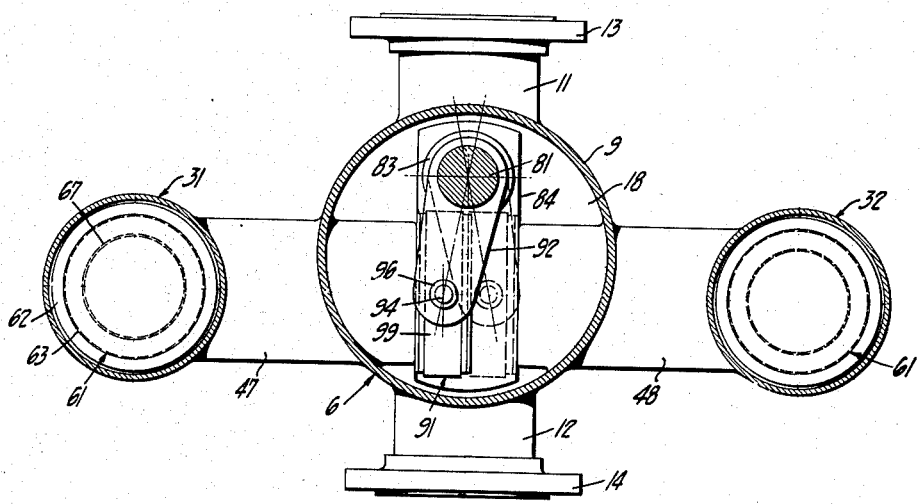
FIG_6_
INVENTOR.
Joseph T. Voorheis
BY Marcus Lothrop
Attorney June 22, 1954     J. T. VOORHEIS     2,681,736
DUPLEX STRAINER
Filed Aug. 20, 1948
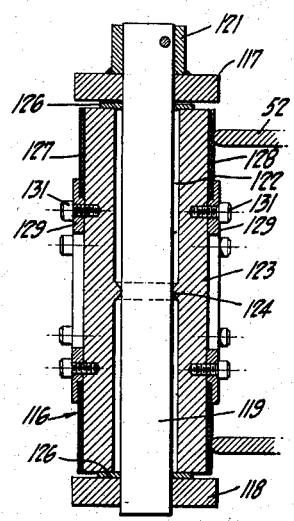
FIG_4_
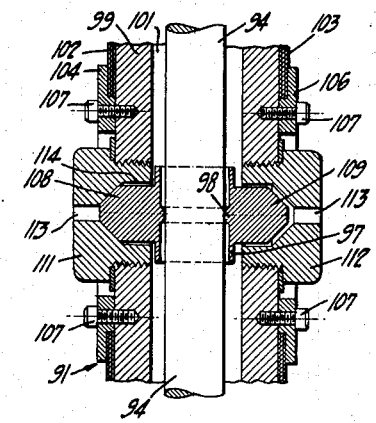
FIG_5_
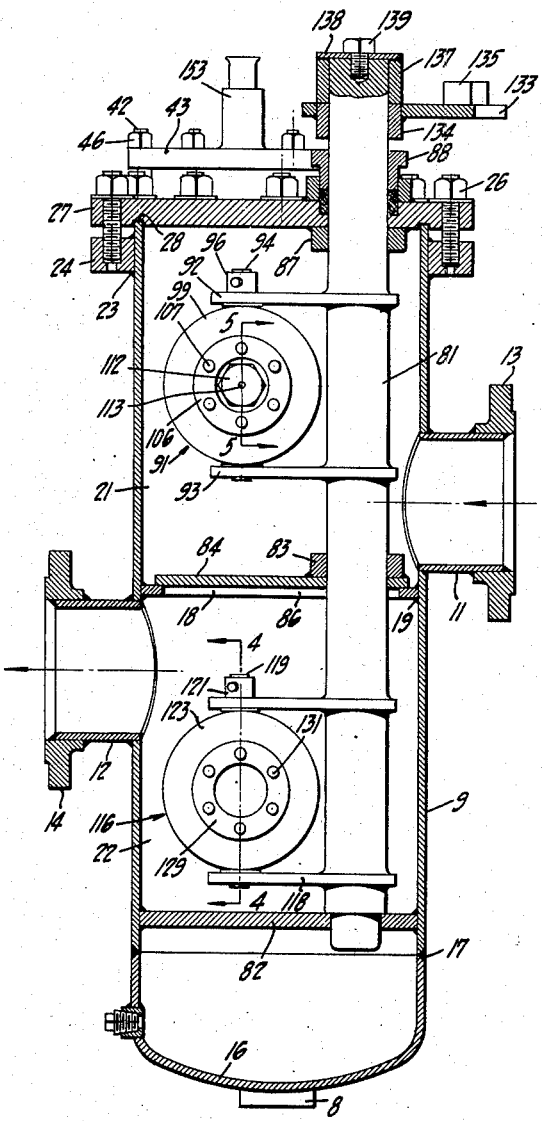
FIG_3_
INVENTOR.
Joseph T. Voorheis
BY *Marcus Lothrop*
Attorney Patented June 22, 1954

2,681,736

UNITED STATES PATENT OFFICE 2,681,736

DUPLEX STRAINER

Joseph T. Voorheis, Piedmont, Calif., assignor to The Coen Company, San Francisco, Calif., a corporation of California Application August 20, 1948, Serial No. 45,370

1 Claim. (Cl. 210—168)

My invention relates to means for use in straining liquid materials, especially relatively large quantities of hydraulic fluid, such as oil or fuel. In many installations, the duplex strainer is utilized as an integrally installed portion of a continuously operating liquid line so that one element of the strainer operates while the other one is idle. The idle element is then available for cleaning and restoration to original straining condition. When the operating strainer becomes substantially clogged or just prior thereto, the mechanism is operated in such a way that the previously cleaned, idle strainer is again positioned in the fluid line, while the operating strainer is removed from functioning. In this way the fluid flow can continue uninterruptedly while a strainer is available for cleaning periodically.

In many installations, the pressure of the liquid is not particularly high and no especial problems arise but difficulty arises in providing a strainer for relatively high pressure lines, especially lines of considerable size.

It is therefore the object of my invention to provide a duplex strainer suitable for use in high pressure lines, especially those of considerable capacity.

Another object of the invention is to provide a duplex strainer in which there is an interlock so that only the strainer not in use and at low pressure can be removed for cleaning.

An additional object of the invention is to provide a duplex strainer of fabricated construction.

A further object of the invention is to provide a duplex strainer for use in high pressure lines in which the power required or effort required to shift operation from one strainer to the other is relatively small and can readily be accomplished by an attendant.

An additional object of the invention is to provide a duplex strainer in which the portion under high pressure cannot accidentally be opened to the atmosphere and in which the portion of the strainer available for opening to the atmosphere is isolated from high pressure.

A further object of the invention is to provide a duplex strainer which can readily be taken apart for inspection, repair, cleaning and replacement of parts.

A further object of the invention is in general to improve strainers of this character.

Other objects together with the foregoing are attained in the embodiment of the invention described in the accompanying description and illustrated in the accompanying drawings, in which Figure 1 is a view from one side showing a part of my strainer in elevation most of the mechanism being broken away and disclosed in cross-section on a vertical median plane.

Figure 2 is a plan of the duplex strainer shown in Figure 1.

Figure 3 is a cross-section, the plane of which is indicated by the line 3—3 of Figure 2.

Figure 4 is a detail showing the lower valve, the drawing being a cross-section on the line 4—4 of Figure 3.

Figure 5 is a detail showing the upper valve, the view being a cross-section on the line 5—5 of Figure 3.

Figure 6 is a cross-section, the plane of which is indicated by the line 6—6 of Figure 1.

In its preferred form, the duplex strainer of my invention comprises a strainer body adapted to be installed in a fluid line and having a means for diverting the incoming fluid to either of two strainer chambers and discharging strained fluid from such chambers through an outlet. There is provided a valving arrangement to isolate whichever one of the strainer chambers is not included in the line and a pilot valve arrangement so that the pressure within the strainer body can be equalized to permit ready manual movement of the valving arrangement. Furthermore, the valving structure is so connected to the strainer structure as to interfere with the removal of the strainer which is operatively included in the line and to permit the removal only of the strainer which is not included in the line.

The duplex strainer of my invention is readily fabricated in many different ways in especial accordance with the environment and usage that it is designed for, but it has been successfully incorporated in the form disclosed herein. In this form there is provided a strainer body generally designated 6, designed to rest on any suitable base (not shown) and provided with feet 7 and 8 so that it can be appropriately supported and fastened thereon. The strainer body 6 includes a central tubular housing 9 preferably comprised of a steel section having an inlet duct 11 secured thereto by welding and an outlet duct 12 likewise secured thereto by welding. Flanges 13 and 14 are provided so that the body 6 can be suitably included in a liquid line (not shown) and can be fastened therein to transmit liquid through the strainer body without leakage and at high pressure.

The central shell 9 is closed at its lower end by a cap 16 secured thereto by a ring of welding 17 and between its ends is spanned by an intermemediate partition 18 connected to the sides by a line of welding 19 and dividing the shell 9 into an upper inlet compartment 21 and a lower outlet compartment 22. The barrier 18 is effective substantially to separate the inlet 11 from the outlet 12. The upper end of the shell 9 is enlarged and is secured by a line of welding 23 to a flange 24. A cover-plate 27 is secured to the flange by a plurality of removable fastenings 26 in fluid tight relationship. In fact, the cover-plate 27 is preferably provided with an annular groove 28 receiving the up-standing portion of the shell 9 so that a tight engagement is afforded when the fastenings 26 are secure and so that the cap 27 can quite readily be removed upon removal of the fastenings 26.

Disposed symmetrically with respect to the shell 9 are several strainer-well housings. Since in the present instance, there are two of such housings and they are substantially identical, a description of one of them is generally applicable to the other. Each of the housings 31 and 32 is comprised of a steel cylinder closed at its lower end by a cap 33 connected thereto by welding 34 and provided with a drain plug 36. Between its ends, the housing is provided with an annular ledge 37 in effect dividing the housing into an upper chamber 38 and a lower chamber 39. The upper portion of the housing is provided with a plurality of lugs 41 serving as mounts for fastening studs 42 projecting through the covers 43 and 44 of the respective housings. Nuts 46 complete the removable fastening arrangements.

There are upper conduits 47 and 48 respectively connected to the housings by welding 49 and extending in coaxial relationship and diametrically into the shell 9. The conduits 47 and 48 terminate with squared ends some distance apart and on opposite sides of the central axis 51 of the shell 9. They establish free communication between the upper chamber 21 of the shell 9 and the upper compartments 38 of the housings 31 and 32. Similarly, lower conduits 52 and 53 are secured respectively to the housings 31 and 32 by lines 54 of welding and to the shell 9 by similar lines 56 of welding. The conduits 52 and 53 also are coaxial and extend diametrically into the shell 9 terminating in spaced apart relationship on opposite sides of the axis 51 and substantially the same distance apart as are the conduits 47 and 48. The conduits 52 and 53 establish free communication between the lower chamber 22 of the shell 9 and the lower compartments 39 of the housings 31 and 32.

Disposed in the housings are strainer mechanisms generally designated 61, and since these are identical, a description of one applies also to the other. Resting upon the ledge 37 is a flanged ring 62, to which an outer screen 63 is secured. This screen is any preferred kind of perforate or foraminous sheet and is generally circular cylindrical in contour. At its lower end it is secured to an annulus 64. Resting on the annulus is a ring 66 secured to the lower end of an inner screen 67. A spring clip 68 engages the member 64 and holds the ring 66 in normal engagement with the ring 64 but the spring can be deformed to release the rings 66 and 64 so that the inner screen 67 can be disassembled from the outer screen 63. A reenforcement 69 assists in maintaining the rigidity and mechanical relationship of the lower end of the screens.

The inner screen 67 extends upwardly to a point adjacent the top of the upper compartment 38 where it is substantially closed by a solid disc 71 carrying a central slidable pin 72 prevented from dislodgment by a collar 73. The pin ends in an enlarged head 74 adjacent the cap 43 and in fact is held in abutment with the cap by a spring 76. With this arrangement, the spring 76 is effective when the cap 43 is installed to hold the strainer in position against any substantial flow between the upper compartment 38 and the lower compartment 39 except through the meshes of the strainer itself.

In accordance with my invention, I provide means for alternately connecting either the chamber 31 and its included strainer or the chamber 32 and its associated strainer in the circuit between the inlet 11 and the outlet 12. Disposed within the shell 9 in the plane of the axis 51 but eccentric with respect thereto as shown in Figure 3 is an operating shaft 81 at its lower end reduced in diameter to form a bearing in a strap 82 spanning the walls of the shell 9 and serving as a shaft support. Between its ends the shaft passes through a journal 83 formed by a brace plate 84 overlying a somewhat elongated opening 86 in the central plate 18. The shaft 81 extends through the upper compartment 21 and through the cap plate 27 to a convenient external point. Where it passes through the cap plate 27, the shaft is located by a journal 87 and leakage is precluded by a packing gland 88.

So that the fluid entering the chamber 21 from the inlet 11 can be diverted into either one of the conduits 47 or 48 and will be precluded from entering the other, I provide a valve generally designated 91 on the shaft 81. To hold the valve, there is mounted on the shaft 81 a pair of arms 92 and 93 respectively which are provided adjacent their outer ends with apertures to receive a through shaft 94. The shaft is held against falling by a set screwed collar 96 at its upper end resting on the top arm 92. The shaft 94 can readily be removed upwardly, if desired, to release the valve 91 from its mounting between the arms 92 and 93. Since the shaft 94 may not be quite in alignment with the rest of the structure, and in order to provide a proper mechanical relationship with the adjacent ends of the conduits, such as 52 as shown in Figure 4, which serve as valve seats, I mount on the shaft 94 a loosely fitting sleeve 97. This has considerable freedom of movement with respect to the shaft 94 except as it is partially restrained by an inwardly extending annular rib 98 of round cross-sectional contour so that in effect, there is a limited universal movement of the sleeve 97 with respect to the shaft 94 so that the sleeve and its attendant parts can assume a slightly different attitude than the shaft 94.

Encompassing the sleeve is a valve body 99 having an enlarged bore 101 extending therethrough to surround the shaft 94 quite freely. The sides of the valve body 99 carry gasket discs 102 and 103 for abutment with the adjacent seat on the end of the conduit 48 or 47. The gaskets are located in position and held for ready renewability by flanged wings 104 and 106 held in place on the body 99 by fastenings 107. As the shaft 81 is rotated through a relatively small angle, either the gasket 102 or the gasket 103 is forced into abutment with the adjacent conduit end. It is able to orient itself to provide a firm, leak-proof contact therewith, despite minor irregularities in the position of the shaft 94 because of the connection through the internal annulus 98. Even so, the pressure exerted by the shaft 94 upon either of the sealing gaskets is applied substantially at the center thereof and is uniformly distributed.

Since the pressure within the inlet chamber 21 can be of a relatively high value, and as the pressure within whichever of the conduits 47 or 48 is closed by the valve 97, may be quite low, even atmospheric, and because the area of the valve 91 in any large size equipment is considerable, I provide means for equalizing the pressure on opposite sides of the valve so that thereafter it can readily be dislodged from its seat. For that reason, the sleeve 97 is provided on opposite sides with a pair of poppet or needle valves 108 and 109 respectively designed to cooperate alternately with one of a pair of plugs 111 engaging one side of the disc 99 adjacent the gasket 102 or the other plug 112 engaging the opposite side of the disc adjacent the gasket 103. Each of the plugs is provided with an outlet aperture 113 and with an enlarged clearance 114 so that except for seating of the needle valve 108 or 109 therein, there is adequate space for free fluid flow.

The seating of the plugs and the dimensions of the needles are such that one or the other of the needles is open whereas the remaining one is closed. The arrangement is such that when the shaft 81 is initially rotated to dislodge the valve 91 from its seat, the sleeve 97 closes the previously open valve 109 and opens the previously closed valve 108. Because of the small size of these parts, there is little difficulty in overcoming the unbalanced pressure thereon. As soon as or shortly after the valve has been opened, however, flow through the passageway, for example 113, effects an equalization of pressures on opposite sides of the main valve 91 which then can be lifted or pulled from its seat with only nominal effort. The valve can thus be removed readily from its seat on either of the conduits 47 or 48.

The lower compartment 22 is likewise provided with a suitable valve 116 so that either of the housings 31 or 32 can be completely isolated from the central shell 9; that is, both its inlet and its outlet can simultaneously be blocked. The valve 116 is disposed between a pair of arms 117 and 118 extending from the shaft 81. A pin 119 provided with a collar 121 extends through suitable apertures in the arms and extends through the generally enlarged center passageway 122 to the body 123 of the valve. Adjacent its center the passageway 122 is considerably reduced in diameter to form a rounded internal annulus 124 bearing upon the pin 119 and affording a limited universal movement or aligning movement between the valve body 123 and the pin. The valve is generally confined although with some freedom by washers 126 between the valve body and the adjacent arms. On opposite sides of the valve disc 123 are gaskets 127 and 128 respectively, held in position by rings 129 and fastenings 131. The valve 116 can be moved into sealing and self-aligning relationship with the seat terminals of either of the conduits 52 and 53.

It is not necessary in case of the valve 116 to provide a pilot valve mechanism since the valve 116 operates only at low pressure being in communication with the outlet 12 through the compartment 22. The valves 116 and 91 are, however, aligned as closely as possible so that they simultaneously open and close their respective conduits. By appropriately rocking the shaft 81, therefore, an operator can readily isolate either of the housings 31 or 32 and activate the other one by connecting it to the inlet and outlet. At the same time, the valve structure is readily removable when the cap 27 is removed, since a mere withdrawal of the shaft 81 disengages its lower end from the strap 82 and the valves are withdrawable, the lower one 116 passing readily through the opening 86. Normally, the high pressure within the compartment 21 urges the closure or brace plate 84 into fluid tight engagement with the partition disc 18.

In order appropriately to actuate the shaft 81, I provide at its upper end an operating plate 133, having a hub 134 secured to the shaft 81 just above the packing gland 88. The plate rotates with the shaft and carries a pair of up-standing lugs 135 and 136 symmetrically arranged at opposite ends thereof. Journaled on the upper end of the shaft 81 is a hub 137 freely rotatable thereon and held against axial dislodgment upwardly by a cap washer 138 and a cap screw 139. The hub 137 is provided with an extending lever 141 in the general plane of and designed to abut either of the lugs 135 and 136 but having a wide angle of free movement therebetween. When the lever 141 is rocked in an arc, it abuts first the lug 136 and then carries the shaft 81 with it into one extreme position. When the lever is moved through its path into its other extreme position, it finally abuts the lug 135 and rocks plate 133 and the shaft 81 into the other extreme position.

The relatively wide range of motion of the lever 141 is utilized to afford an interlocking arrangement and there is likewise included a force multiplying mechanism to assist in the valve operation. For that reason the outboard end of the lever 141 terminates in an ear 142 connected by a pivot pin 143 with a clevis 144 in common with a threaded rod 146. Surrounding and in engagement with the thread is a knurled sleeve 148, at its opposite ends having oppositely directed threaded engagement with a stem 149 enlarged into an eye 151 overlying a boss 152 on the cap 44. A quite similar boss 153 extends upwardly from the cap 43 in line for engagement with the eye 151. The eye can be slightly displaced to be disengaged from its associated one of the bosses 152 and 153. The relationship of the lever 141 and its attached mechanism to the cover 44 is such that the cover cannot be removed until the attachments and the lever have been first taken off. Since the cover 44 closes the compartment 32 which is in operation under high pressure, there is no possibility of opening such compartment inadvertently. Only the cover 43 can then be removed and its contents inspected or serviced.

When the compartment 32 is to be attended to, the eye 151 is detached from the boss 152 since there is enough play in the clevis 144 to permit such motion and it is then swung with the lever 141 into the dotted line position shown in Figure 2. In the meantime, the knurled sleeve 148 is rotated against the opposite threads 146 and 149 to extend the length of the mechanism and so that the eye 151 can be hooked over the boss 153. At the time the lever 141 is in abutment with the lug 135 which is still in its full line position as shown in Figure 2. When the eye 151 has been properly hooked, the knurled wheel 148 is then rotated and the screws are effective to assist the final rotation of the lever 141. Since this still is in abutment with the boss 135, the entire plate 133 is rotated carrying the shaft 81 and the valves with it. The compartment 32 is thus isolated from the high pressure and the compartment 31 is connected thereto. The sleeve 148 is operated until the valves 91 and 116 are tightly seated with the compartment 32 completely isolated.

With this arrangement, I have provided a duplex strainer effective for high pressure, large quantity installations yet one which can easily be operated manually and one in which there can be no possibility of mistakenly opening the high pressure chamber to the air. Furthermore, the entire arrangement is readily and simply manufactured and repaired since it is fabricated of a number of essentially simple yet strong metallic shapes.

I claim:

A duplex strainer comprising a pair of strainer housings, a central shell, a pair of conduits establishing communication between said housings and said shell, means for connecting said shell to a relatively high pressure, means for connecting said housings to a relatively low pressure, a first main valve disc having a first passage therethrough and adapted to control said communication and subject to said different pressures, a first pilot valve for controlling communication through said first passage between one of said housings and said shell, a second main valve disc having a second passage therethrough and adapted to control said communication and subject to said different pressures, a second pilot valve for controlling communication through said second passage between the other of said housings and said shell, and a common actuator for both of said pilot valves and said main valve discs.

References Cited in the file of this patent

UNITED STATES PATENTS

| Number | Name | Date |
| --- | --- | --- |
| 327,803 | Lewis | Oct. 6, 1885 |
| 1,113,441 | Hunziker | Oct. 13, 1914 |
| 1,187,046 | De Lamarter | June 13, 1916 |
| 1,288,257 | Stewart | Dec. 17, 1918 |
| 1,408,822 | Mosher | Mar. 7, 1922 |
| 1,625,024 | Hall | Apr. 19, 1927 |
| 1,634,086 | Scoville | June 28, 1927 |
| 1,675,505 | McNeal | July 3, 1928 |
| 1,685,303 | Voorheis | Sept. 25, 1928 |
| 1,758,565 | Elliott | May 13, 1930 |
| 1,850,094 | Dean | Mar. 22, 1932 |
| 1,919,031 | Muhleisen | July 18, 1933 |
| 2,219,137 | Moon | Oct. 22, 1940 |
| 2,540,300 | Smith | Feb. 6, 1951 |